United States Patent

Fortmann

[15] 3,667,644

[45] June 6, 1972

[54] REVERSING RUPTURE DISC FOR PROTECTING EQUIPMENT FROM EXCESSIVE PRESSURE AND METHOD OF MANUFACTURE

[72] Inventor: Manfred Fortmann, Bensberg, Germany

[73] Assignee: Interatom Internationale Atomreaktorbau GmbH, Bensberg/Cologne, Germany

[22] Filed: May 22, 1970

[21] Appl. No.: 39,781

[30] Foreign Application Priority Data

May 24, 1969 Germany ......................P 19 26 706.2

[52] U.S. Cl. ..........................................................220/89 A
[51] Int. Cl...........................................................B65d 25/00
[58] Field of Search.......................................220/89 R, 89 A

[56] References Cited

UNITED STATES PATENTS

| | | | |
|---|---|---|---|
| 2,242,547 | 5/1941 | Raymond | 220/89 A |
| 2,915,216 | 12/1959 | Coffman | 220/89 A |
| 2,656,950 | 10/1953 | Coffman | 220/89 A |
| 3,467,120 | 9/1969 | Hill et al. | 220/89 A |

FOREIGN PATENTS OR APPLICATIONS

| | | | |
|---|---|---|---|
| 250,748 | 3/1966 | Austria | 220/89 A UX |
| 748,953 | 5/1956 | Great Britain | 220/89 A UX |

*Primary Examiner*—M. Henson Wood, Jr.
*Assistant Examiner*—Edwin D. Grant
*Attorney*—Curt M. Avery, Arthur E. Wilfond, Herbert L. Lerner and Daniel J. Tick

[57] ABSTRACT

A reversing rupture disc assembly for protecting a vessel or other apparatus from excessive pressure has a carrier ring mountable in the apparatus and a reversing rupture disc tightly positioned in the ring. The disc has a curvature obtained by imparting a force thereto so as to strain the material from which the disc is made. The disc is disposed in the ring, so that the convex surface of the disc is directed toward the pressure. The disc has a weak buckling zone located in the mid-region of the disc, whereby the disc buckles inwardly and ruptures in response to the excessive pressure, the disc deviating from a spherical form at the mid-region, so that the radius of curvature of the disc decreases going from the mid-region to the edge of the disc and, so that the sector angle $\phi$ of the disc is greater than $3.82\sqrt{S/R}$, where S is the disc thickness and R is the average radius of curvature of the disc. The material of which the disc is made has a positive stress-strain curve after undergoing the strain required to obtain the curvature, the curve having a slope $d\sigma/d\epsilon$ greater than about 100 $kgf/mm^2$.

14 Claims, 5 Drawing Figures

REVERSING RUPTURE DISC FOR PROTECTING EQUIPMENT FROM EXCESSIVE PRESSURE AND METHOD OF MANUFACTURE

My invention relates to a reversing rupture or blow out disc or diaphragm assembly for protecting apparatus and vessels from excessive pressure. More particularly, my invention relates to a reversing rupture disc assembly wherein the disc has a curved portion the convex surface of which is directed toward the operating pressure and functions to protect apparatus and vessels from excessive pressure. My invention also relates to the method of manufacture of the reversing rupture disc assembly.

The manufacture of reversing rupture discs having convex surfaces directed against operating pressure is known from German Patent No. 964,823.

As disclosed in this patent, flat plate discs are tensioned between two specially formed holding rings and are hydraulically loaded beyond the yield point for a definite time such as for one-half hour. After being curved, the discs are controlled and only those discs are used which have a permanent set which lies between definite limits and are formed so as to be uniformly rotation-symmetrical. The permanent set of the discs results from the loading associated with manufacture of the discs. The various strengths resulting from the different thicknesses and strengths of the plate discs are balanced out to a definite extent by the curved portion. The curved discs are separated from their rim portion held by holding rings and are placed in a carrier ring so as to be disposed opposing the pressure. The discs are braced and sealed against the rings. If a definite minimum pressure of response is exceeded, the disc snaps like a membrane, the solder seams tear open and the disc falls out. A typical application of rupture discs or diaphragms is illustrated in the drawing of U.S. Pat. No. 3,168,445 wherein a pressure destructible diaphragm is used with a combination of safety equipment for minimizing the effects of a nuclear reactor accident.

The disadvantage of this known method is that different thicknesses and yield stress of the material have to be balanced out by different curvature elevations. The minimum pressure of response of a reversing rupture disc is dependent upon the modulus of elasticity and geometric dimensions and not from the yield stresses of the material. Holding a determined curvature-forming pressure does not balance out the strength differences of the plate.

It is an object of my invention to provide a reversing rupture disc assembly wherein the reversing rupture disc for which the minimum pressure of response is held substantially more constant than heretofore. More particularly, it is an object of my invention to provide a reversing rupture disc assembly wherein the reversing rupture disc has a minimum pressure of response that remains constant over a long period of use such as four years for example and at a high operating temperature such as 600° C.

It is another object of my invention to provide a method of manufacture for producing the reversing rupture disc assembly.

The instant invention is based on the realization that reversing rupture discs having a curvature directed against the operating pressure will first buckle at a weak buckling location and limit the minimum pressure of response by the weakest position with reference to the buckling action. This weak buckling location occurs in bullet-shaped reversing rupture discs by means of random faults in the material, by means of form faults when making the curvature or by tension in the connection with the disc carrier ring.

These random faults can not be determined by computation and permit an approximate determination of the minimum pressure of response by means of a trial test. Accordingly, it is a feature of the invention to provide a weak buckling zone in the middle region of the reversing rupture disc so that the disc deviates from the spherical or bullet-shaped form previously mentioned in that the radius of curvature reduces going from the middle to the rim of the disc. With this form, the disc first buckles at the middle region and the minimum pressure of response is less, by a definite amount, than the minimum pressure of response needed to cause the ideal hemi-spherical-shaped disc to buckle.

According to another feature of the invention, the sector angle $\phi$ of the curved disc is greater than $3.82 \sqrt{S/R}$, where S is the average thickness of the sheet and R is the radius of curvature as indicated in FIG. 2.

From "The Buckling of Spherical Shells by External Pressure" by Karman and Hsue Shen Tsien, California Institute of Technology 1939, the units of measurement for the terms of the formula given in the preceding paragraph are known and it is also known that if this minimum sector angle of the curved disc in the middle zone is exceeded, no reinforcement from the rim portion of the disc is effective. Therewith, a buckling law for hollow spheres applies to the reversing rupture discs which makes a computation more approximate. The random form errors arising from the rim portion or from the tensioning in holding rings and the weak buckling zones arising therefrom have no meaning for the minimum response pressure with regard to the buckling zone deliberately formed in the mid-portion of the curved disc. Since the form of the disc according to the invention can not only be produced with a mold, but instead, can also be produced by means of hydraulic or pneumatic pressure, it is preferable to use a material that still has a positive stress-strain curve after the expansion required to form the needed curvature, the stress-strain curve having a slope, $d\sigma/d\epsilon$, greater than about 100 $Kgf/mm^2$. If these conditions are fulfilled, there is formed with the freely-shaped curvature imparted to the disc, the curvature being imparted without the aid of a mold, the desired systematic deviation from the bullet-shaped form as a consequence of the respectively different radii of curvature of the disc sheet at the rim whereat expansion is directed in a single direction and at the mid-portion whereat expansion is uniform in a plane.

For long life and high operating temperatures, it is preferable to use high creep-resistant materials that are in a solution-annealing condition prior to imparting the curvature. Such materials could be, for example, nickel-base alloys. These materials have a relatively low modulus of elasticity with a high creep stability and are, according to the invention, precipitation hardened by means of heat treatment after curvature is imparted.

Reversing rupture discs are manufactured from plane metal sheets by tensioning a sheet between two circular holding rings. Curvature is imparted to the sheet by applying a fluid pressure, the latter being hydraulic or pneumatic. According to a feature of the method of the invention, the thickness of each unformed sheet is precisely measured and therewith the height of the curvature required to insure a definite minimum response pressure can be determined, also determined therewith, is the pressure required to obtain this height with consideration being taken of the elastic resilience. And, with the aid of an adjustable feeler mechanism for measuring height, a further increase in pressure is precluded after the desired height is reached. With this method, the differences in thickness of the individual plates are optimally eliminated by the calculated height correction, and the strength differences, that exercise no influence on the elasticity modulus decisive for the buckling action, remains without any effect. According to another feature of the method, as an additional control possibility, the hydraulic pressure required to obtain the height can be designated and compared with the calculated pressure.

The formed reversing rupture discs are tightly secured to a carrier ring for tensioning. This connection can be made by welding or by high-temperature soldering. If the discs are secured to their carrying ring by high-temperature soldering, the disc hardening of the should be undertaken together with the high temperature soldering.

The reversing rupture disc and the method of their manufacture afford the advantage of permitting the minimum-response pressure of the disc to be substantially better maintained than heretofore. In addition, the invention method permits minimizing the occurrance during manufacture of unwanted ruptures in the disc which, with expensive material, is a considerable advantage.

According to another feature of the invention, the curved disc is welded by means of electronic beam welding on only a small portion of its wall thickness, namely, the disc is welded at its surface facing the operating pressure with the carrier ring. The disc or the carrier ring is provided with a small lip projecting in radial direction in the region of the weld seam. The welding seam of small strength brought unto the surface of the disc facing the operating pressure has the advantage that the disc, especially under hydraulic load, not only buckles inwardly and reverse snaps like a membrane when the minimum response pressure is reached, but, also tears with certainty at its entire periphery. The small projection directed in radial direction on the reversing rupture disc or carrier ring has the advantage that the shrinking tension arising after welding does not cause any tears in the region of the weld seam.

The invention will now be described with reference to the accompanying drawings wherein.

Figure 1:
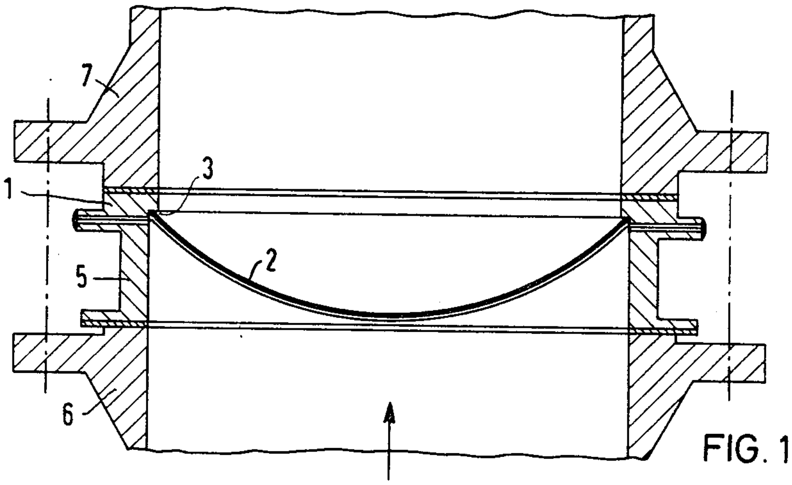
FIG. 1 shows the reversing rupture disc assembly arranged in a conduit of a nuclear reactor circuit.

In FIG. 1, the reversing rupture disc assembly comprises a carrier ring 1 and a disc 2 and is tensioned, together with an intermediate ring 5, between the two pipe flanges 6 and 7 of a conduit for directing the flow of a reactor cooling medium such as sodium. In the event of an accident and the response thereto by the protecting disc assembly; this arrangement facilitates the exchange of the old disc for a new one.

Figure 2:
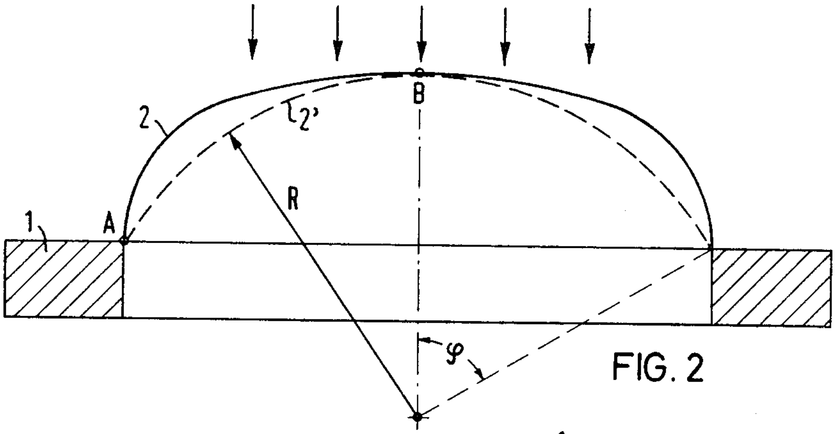
FIG. 2 shows, in schematic representation, a disc assembly of the invention.

To emphasize the deviation of the disc curvature from the ideal bullet or spherical shape, the curvature of the disc 2 is shown somewhat exaggerated. The disc of the invention in FIG. 2 has a flattened middle region or, stated otherwise, the mid region curved portion has a radius of curvature greater than the other curved portions of the disc. The average radius of curvature R corresponds to the inscribed circle portion designated by numeral 2'. The radius R is used for calculation of the minimum pressure of response, which calculation follows from the laws of hollow spheres.

Figure 3:
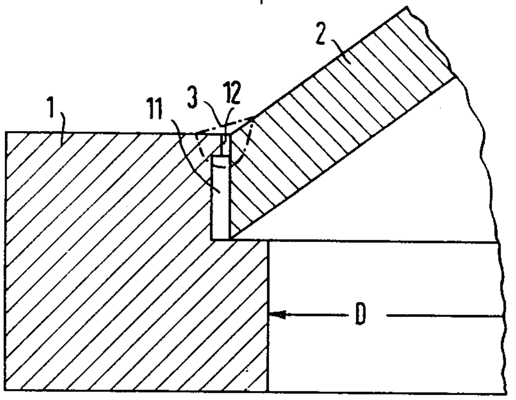
FIG. 3 illustrates the joint between the disc and the carrier ring. The wall thicknesses of the disc assembly are exaggerated for the purposes of illustration.

In addition to the feature of the flattened portion of the disc 2, it is essential for this assembly to respond properly, that the disc be secured to the carrier ring 1. This detail is shown in FIG. 3 wherein the carrier ring 1 has a small projection 12, so that a small gap 11 is provided for the joint 3 connecting the disc 2 to the carrier ring 1. The joint 3 is made so that an influence on the structures of the parts joined remains very small. Therewith it is intended, that this influence not extend over the entire thickness of the disc, preferably, over only one fourth of the thickness. In this way, the tensioned condition of disc 2, which is achieved by the strain hardening of the disc imparted by the method of manufacture as well as a precipitation hardening thereof, is not disadvantageously affected. Also, with this special joining, the distortion of the parts 1 and 2 is very minimal. This type of joint ensures a safe tearing out of the disc when the minimum response pressure is exceeded. For forming the joint, exceptionally high energy heating techniques are required, for example, as with electron beam welding or soldering. If a soldering technique is used, it is practical to use a non-ductil solder so that the separation of the disc from its carrier ring in response to an excessive pressure may be accelerated. To ensure a secure and tight joint, it is proper to sequentially spot solder the disc to the carrier ring at diametrically opposite points about the disc periphery, the mutually adjacent spot solder points being separated from each other by the same distance. Thereafter, the seam joint 3 is applied by means of welding or soldering.

Figure 5:
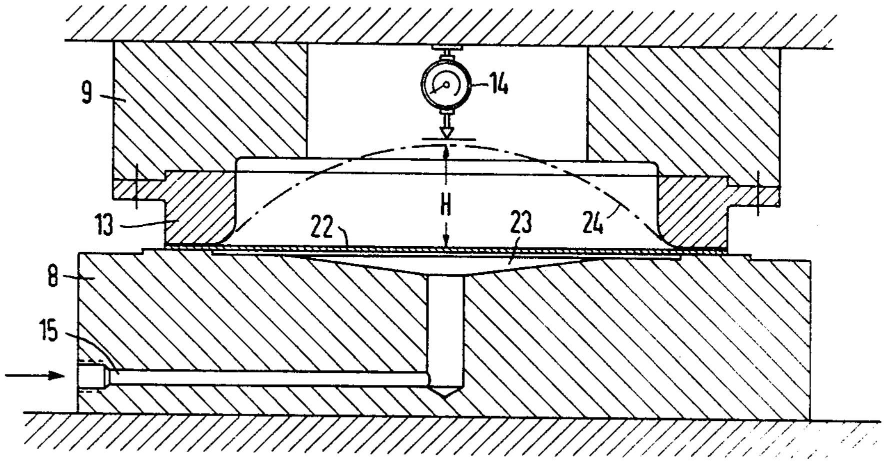
FIG. 5 illustrates an arrangement for imparting the required curvature to the disc of the reversing rupture disc assembly.

FIG. 5 illustrates an apparatus which can be used to practice the method of the invention for producing the disc 2. A plane sheet of material 22 is placed on the lower press part 8 and held tight thereagainst by a ring 13 weighted by a press member 9. A gas or hydraulic medium such as oil or water is directed through a passage 15 in press part 8 and forced under pressure into the intermediate space 23 and against the sheet 22 thereby imparting a curvature to the latter as illustrated by the broken line 24. The curvature height H is determined by means of an extensometer or measuring instrument 14 securely mounted as shown. Other indicating instruments such as of the electrical type are also applicable for this purpose.

Figure 4:
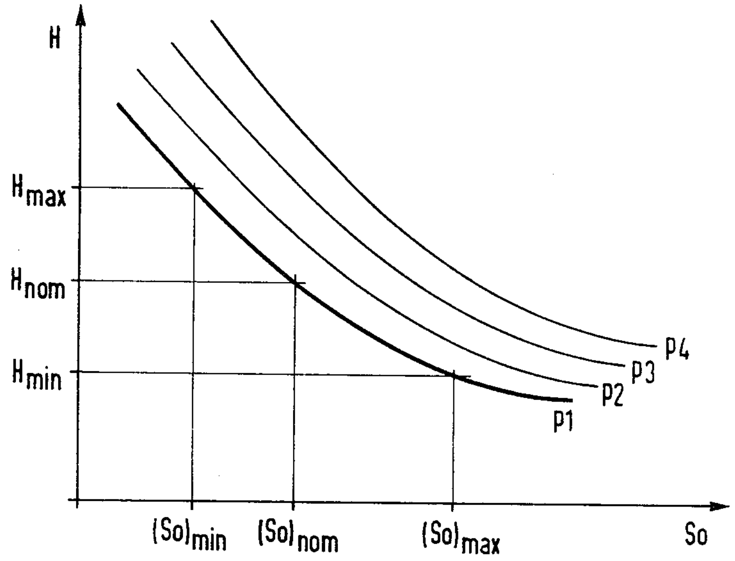
FIG. 4 shows a set of curves showing the dependency of the height of the disc curvature on the initial thickness of the plane sheet and the minimum response pressure.

Since in the sheet 22 to be worked, there are always small tolerances present, it is necessary to bring the height H of the curvature of the disc to a definite value. For this purpose, a diagram corresponding to that of FIG. 4 can be used. FIG. 4 shows the dependence of the height of the curvature H on the initial sheet thickness $S_0$ and the desired minimum response pressure $p$. The minimum response pressure is shown here in the form of a series of curves $p_1$ to $p_4$. Also shown are the minimum, maximum and nominal values of the sheet thickness $S_0$ as well as the curvature height H in dependence upon the desired minimum response pressure, for example, $p_1$. The relations illustrated in FIG. 4 can be determined by calculating and/or empirically by experiment. These values are of course dependent upon the disc material.

The method of imparting a curvature to the disc according to FIG. 5 is carried out by applying a determined pressure so as to impart a curve to the disc which does not yet correspond to the specified value. The pressure is removed and then the curvature height H is measured. Thereafter, a somewhat higher pressure is applied to the disc and after this pressure is removed, the height H is again measured. These steps are repeated until the nominal value of H from FIG. 4 corresponding to the initial thickness is obtained.

To those skilled in the art it will be obvious upon a study of this disclosure that the invention permits of various modifications and hence may be given embodiments other than illustrated and described herein, without departing from the essential features of the invention and within the scope of the claims annexed hereto.

I claim:

1. Reversing blow-out disc assembly for protecting a vessel or other apparatus from excessive pressure comprising a carrier ring mountable in said apparatus and a reversing blow-out disc tightly secured along the periphery thereof to said ring, said disc having a curvature obtained by imparting a force thereto so as to strain the material from which said disc is made, said disc being disposed in said ring and having a convex surface toward the pressure, said disc having a weak buckling zone located in the mid-region of said disc, whereby said disc buckles inwardly to reverse snap like a membrane and separates along said periphery from said ring in response to the excessive pressure, said disc deviating from a spherical form at said mid-region, so that the radius of curvature of said disc decreases going from said mid-region to the edge of said disc and, so that the sector angle $\phi$ of said disc is greater than $3{,}82 \sqrt{S/R}$ where S is the disc thickness and R is the average radius of curvature of the disc, and said material of which said disc is made still has a positive stress-strain curve after undergoing said strain required to obtain said curvature, said curve having a slope $d\sigma/d\epsilon$ greater than about 100 Kgf/mm².

2. In the disc assembly according to claim 1, said material of which said disc is made being a high creep resistant material, said material being in a solution annealing condition before said force is imparted to obtain said curvature.

3. In the disc assembly according to claim 2, said material being a nickel-base alloy.

4. A reversing blow-out disc assembly according to claim 1, said assembly including holding means at the junction of said disc and said ring for securing and sealing said disc to the latter.

5. In a reversing blow-out disc assembly according to claim 4, said holding means being a solder joint.

6. In a reversing blow-out disc assembly according to claim 4, said ring having shoulder means disposed on the inner periphery thereof and adjacent said disc, said holding means being a weld joint joining said disc to said ring to said shoulder means.

7. In a reversing blow-out disc assembly according to claim 6, said weld joint being disposed at said junction so as to join said disc to said ring at the convex side of said disc.

8. Method of producing a reversing blow-out disc which comprises the steps of tensioning a plane sheet between two circular holding members, successively applying and removing fluid pressure to said sheet for imparting a curvature thereto, each successive application of pressure being of greater intensity than the preceding application, measuring the height of said curvature after each application of pressure has been removed, discontinuing said applications of pressure when said height has reached a value determined from the initial thickness of said sheet and the pressure at which said disc shall buckle and rupture, and separating said disc from its rim portion held between said holding members.

9. In a method according to claim 8, said height of said curvature being measured by a feeler mechanism.

10. The method according to claim 8, said method including the final step of heat treating said disc so as to precipitation harden the same.

11. The method according to claim 8, wherein the reversing rupture disc assembly is produced by including the step of joining the disc to a carrier ring after said curvature is imparted to said disc.

12. In a method according to claim 11, said disc being jointed to said carrier ring by welding.

13. In a method according to claim 11, said disc being joined to said carrier ring by soldering.

14. The method according to claim 11, said method including the step of heat treating said disc while simultaneously soldering the latter to said carrier ring.

* * * * *